United States Patent [19]

Lührmann et al.

[11] Patent Number: 5,076,917

[45] Date of Patent: Dec. 31, 1991

[54] FILTER CANDLE AND FILTER STOCKING

[75] Inventors: Theo Lührmann; Wilfried Hocks; Hannes von Harpe, all of Krefeld, Fed. Rep. of Germany

[73] Assignee: Bayer Aktiengesellschaft, Fed. Rep. of Germany

[21] Appl. No.: 649,496

[22] Filed: Feb. 1, 1991

[30] Foreign Application Priority Data

Feb. 16, 1990 [DE] Fed. Rep. of Germany ....... 4004794

[51] Int. Cl.[5] .............................................. B01D 25/00
[52] U.S. Cl. .................. 210/232; 210/323.2; 210/324; 210/483; 210/497.01
[58] Field of Search ........... 210/483, 484, 485, 497.01, 210/497.2, 651, 341, 489, 497.1, 232, 247, 323.2, 324

[56] References Cited

U.S. PATENT DOCUMENTS

| | | | |
|---|---|---|---|
| 3,556,304 | 1/1971 | Collard et al. | 210/489 |
| 4,248,713 | 2/1981 | Meier | 210/323.2 |
| 4,288,330 | 9/1981 | Strub | 210/497.01 |
| 4,336,043 | 6/1982 | Aonuma et al. | 210/323.2 |
| 4,428,838 | 1/1984 | Creps et al. | 210/323.2 |
| 4,650,580 | 3/1987 | Schumacher | 210/323.2 |
| 4,816,162 | 3/1989 | Rosskopf et al. | 210/651 |

FOREIGN PATENT DOCUMENTS

3326288 12/1988 Fed. Rep. of Germany.

Primary Examiner—Robert A. Dawson
Assistant Examiner—Ana Fortuna
Attorney, Agent, or Firm—Connolly & Hutz

[57] ABSTRACT

The specification relates to a filter candle for filtering highly-viscous fluids, e.g. polymer melts, and in a number of parts which can be dismantled and comprising a filter stocking permanently connected to a cap, the two parts being replaceable together. Owing to the complete absence of screwed components, the filter candle can be made very small. It is also easier to take apart and clean when clogged by solidified residues of melt. Individual parts can easily be replaced when unserviceable. The complete filter candle has a plug connection to a baseplate, from which it can rapidly be separated.

7 Claims, 1 Drawing Sheet

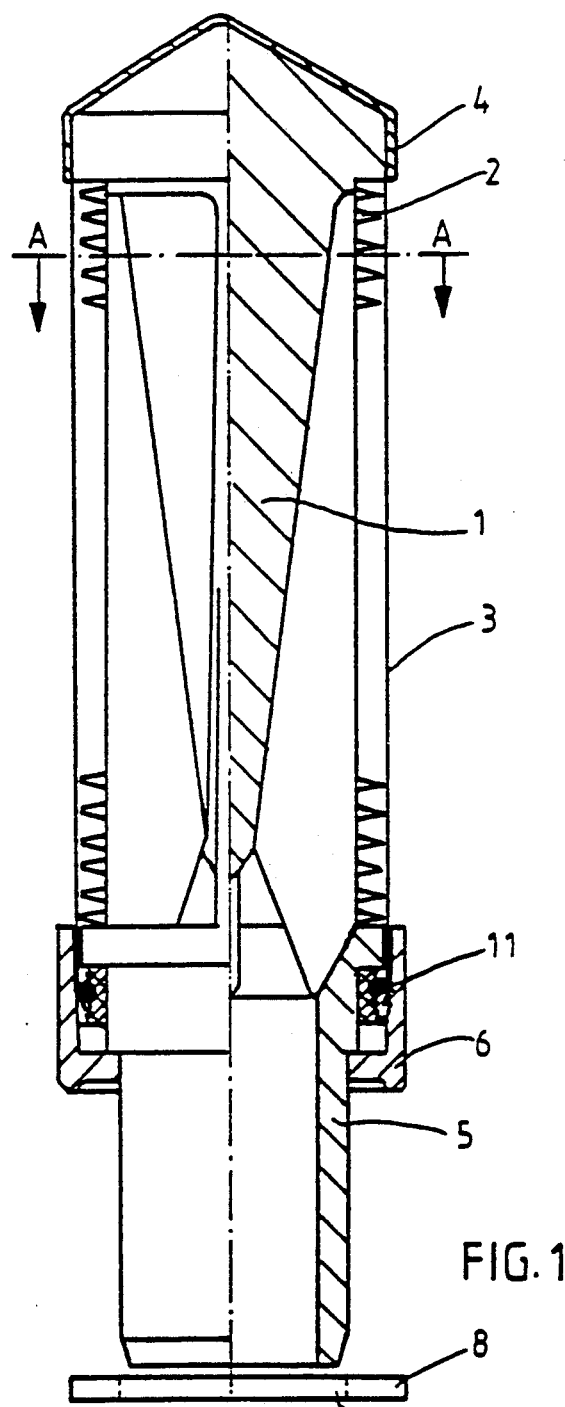
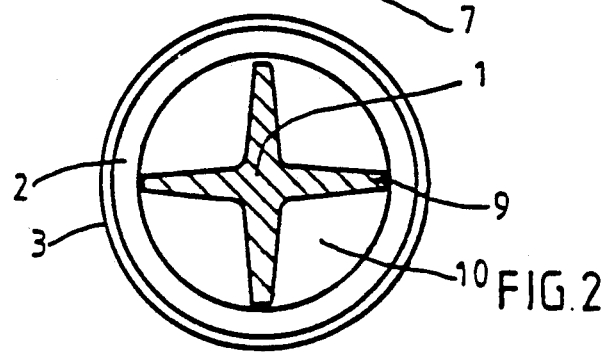
FIG. 1
FIG. 2

FILTER CANDLE AND FILTER STOCKING

The invention relates to a filter candle for filter devices, more particularly for filtering relatively highly viscous fluid media, comprising a filter member, a supporting element and a filter stocking which is secured sealingly and releasably to the upper end of the filter member by a cap and is sealingly and releasably secured to the base of the filter member by a connecting device.

Filter candles of this kind are known e.g. from DE-C2-3326288. The known filter candle comprises a displacement member surrounded by a suppporting tube The outside of the supporting tube carries a filter hose, which is replaceable In order to replace the filter hose, the complete filter candle must be unscrewed from the base. For this purpose, the top end of the filter candle is constructed as a hexagonal screw After the complete filter candle has been unscrewed, a cone ring must be unscrewed from the top end of the filter candle in order to replace the filter hose. The cone rings (there is also one at the bottom end of the filter candle) press the filter stocking against sealing rings, which are connected to the displacement member. In order to change the filter stocking, after the cone ring has been unscrewed the stocking has also to be slid over the sealing rings and the new filter stocking has to be slid on and secured by the same steps in reverse order.

One disadvantage of the known filter candle and replaceable stocking is the time-consuming complicated procedure necessary for changing the filter stocking. Furthermore, the top part is constructed with abutments areas for spanners or the like, resulting in stagnant spaces around the filter candle, where temperature-sensitive substances may be retained. The stagnant spaces also increase the diameter of the individual filter candle, so that the individual filter candles are more difficult to pack tightly into a larger filter unit in the conventional manner in industrial filtration of polymer melts.

DE-B2-2512781 laid-open specification also discloses a filter candle for reversible-flow filter devices, in which the supporting member is permanently connected to a cover and nozzle, either by means of a thermosetting sealing material or by a weld connection between the supporting member and the cover or nozzle.

The disadvantage of this device is that when the filter candle becomes unserviceable it has to be replaced as a whole, and consequently the filters are used up more quickly in processes in which the filter devices are frequently clogged by residues of melt but the flow cannot be reversed.

The object of the invention therefore is to develop a small, very simply-constructed filter candle which produces substantially no stagnant spaces in the polymer melt and can be tightly packed to form larger filter units, and where the filter gauze, if irreversibly damaged by solidified residues of melt, can easily be replaced without throwing away the complete filter candle.

To this end, by means of the novel device, a filter stocking is permanently connected to a cap, constructed so as to assist the flow, and the filter stocking and filter cap constitute a replaceable unit.

The filter stocking and cap are preferably made of metal, particularly preferably high-quality steel. The permanent connection between the filter cap and gauze is preferably by welding or soldering. Since there are no abutment surfaces for spanners, the filter cap can be constructed largely free of stagnant spaces. Also, the filter candle having the novel features can more particularly be made small, e.g. with a total height of under 15 cm or under 10 cm, the outer radius of the cap being only slightly greater than that of the filter stocking. Consequently the diameter of the novel filter candle can be kept very small, e.g. under 5 cm or even under 3 cm or even under 2 cm. The result is an embodiment of the complete filter candle which closely abuts the filter member, so that individual filter candles can be more tightly packed to form larger filter elements. The preferred shape of the cap is basically a cone with an acute or obtuse cone angle. The outer edge of the cap is made substantially cylindrical, to provide a large surface for securing the filter stocking. The interior of the cap is constructed basically as a fit or seat which tightly surrounds the head of the filter member, resulting in a sealing-tight, releasable connection to the filter member. A cap constructed in this manner assists the flow and also has the advantage of simple, cheap manufacture.

The bottom part of the filter candle is sealed by an annular tapered cone. When the cone is slid over the filter member and gauze, the bottom part of the gauze is sealingly and releasably clamped between the tapered cone and a sealing ring associated with the bottom part of the filter member. By this means, the cone is secured and the bottom part of the filter member is partitioned off into a melt space and a filtrate space.

A particularly preferred embodiment is characterised in that all the components, more particularly the sealing and releasable connections, are constructed without threads.

Surprisingly, in spite of this threadless embodiment, an adequate seal is obtained between the melt space and the filtrate space. One advantage of this embodiment is that the filter candle constructed in this manner can be dismantled particularly easily and quickly. The threadless components are also quicker and easier to clean. Also, owing to the absence of abutment surfaces for screwing tools, all the components can be constructed so as particularly to assist the flow.

Another preferred embodiment of the invention is characterised in that the supporting element is a simple wire coil without additional supporting rods as disclosed e.g. in DE-B2-2512781, and loosely surrounds the filter member, which gives protection against lateral slipping.

The filter member has a substantially cylindrical basic shape, formed with axial drainage chambers for the filtrate. The wire coil is preferably secured by four or six radial webs, which also laterally bound the drainage chambers. The advantage of this embodiment is that after the filter member has been separated from the supporting member, the two components can more easily be freed from solid filtrate residues and only have to be replaced individually when unserviceable.

Another preferred embodiment is characterised in that the base of the filter member has a threadless connecting nozzle and a plug connection to a corresponding hole in a baseplate.

A particular advantage of this embodiment is the simple plug connection between the baseplate and filter candle. Surprisingly, this kind of connection can sealingly separate the melt side from the filtrate side. In addition, in this embodiment the filter candle is particularly easy to replace.

An embodiment of the novel device is shown in vertical and horizontal section in the following drawings and described hereinafter.

FIG. 1 shows a vertical section through the filter candle. The interior of the filter candle comprises a filter member 1 loosely surrounded by a wire coil 2. A filter stocking 3 is adjacent the filter member 1 and the supporting element 2 and is welded to a cap 4 at its end. The interior of cap 4 is bounded by a correspondingly shaped cavity, which forms a fit or seat and sealingly and releasably surrounds the head part of the filter member 1. The bottom part of the filter member 1 is open towards the baseplate or filtrate chamber and constitutes a substantially cylindrical threadless connecting nozzle 5 provided with a sealing ring 11. Ring 11 is connected to an annular conical sealing device 6, the bottom part of the filter stocking 3 being clamped between ring 11 and cone 6. The connecting nozzle 5 can be plugged into a corresponding hole 7 in a baseplate 8.

FIG. 2 shows a horizontal section through the filter candle. The filter member 1 has four connecting webs 9 separated by cavities 10 for discharging the filtrate. The filter member 1 and webs 9 are surrounded by the wire coil 2, outside which is the filter stocking 3.

The filter candle is replaced by pressing on the nozzle 5 and releasing it from the baseplate 8. After removing the sealing ring 6, the cap 4 is pulled so as to separate the filter stocking 3 and cap 4 from the rest of the filter candle. After the parts have been replaced or cleaned, the filter candle can be inserted into the baseplate 8 by the same steps in reverse order.

What is claimed is:

1. A filter candle for filter devices, more particularly for filtering relatively highly viscous fluid media, comprising a filter member (1), a supporting element (2) and a filter stocking (3) which is secured sealingly and releasably to the upper end of the filter member (1) by a cap (4) and is sealingly and releasably secured to the base of the filter member (1) by a sealing device (6) and an associated sealing ring (11), wherein the filter stocking (3) is permanently connected to the cap (4) and the stocking (3) and cap (4) constitute a replaceable unit.

2. A filter candle according to claim 1, wherein all the components, more particularly the sealing and releasable connections, are constructed without threads.

3. A filter candle according to claim 1, wherein the supporting member (2) is a wire coil loosely surrounding the filter member (1), which is correspondingly shaped.

4. A filter candle according to claim 1, wherein the base of the filter member (1) has a threadless connecting nozzle (5) and a plug connection to a corresponding hole (7) in a baseplate (8).

5. A filter candle according to claim 2, wherein in that the supporting member (2) is a wire coil loosely surrounding the filter member (1), which is correspondingly shaped.

6. A filter candle according to claim 2, wherein in that the base of the filter member (1) has a threadless connecting nozzle (5) and a plug connection to a corresponding hole (7) in a baseplate (8).

7. A filter candle according to claim 3, wherein in that the base of the filter member (1) has a threadless connecting nozzle (5) and a plug connection to a corresponding hole (7) in a baseplate (8).

* * * * *